(12) United States Patent
Woo

(10) Patent No.: US 8,098,546 B2
(45) Date of Patent: Jan. 17, 2012

(54) GEOPHONE HAVING IMPROVED SENSITIVITY

(75) Inventor: Daniel M. Woo, Missouri City, TX (US)

(73) Assignee: Geospace Technologies, LP, Houston, TX (US)

( * ) Notice: Subject to any disclaimer, the term of this patent is extended or adjusted under 35 U.S.C. 154(b) by 356 days.

(21) Appl. No.: 12/499,741

(22) Filed: Jul. 8, 2009

(65) Prior Publication Data

US 2011/0007607 A1 Jan. 13, 2011

(51) Int. Cl.
*H04R 9/00* (2006.01)
*H04R 11/00* (2006.01)

(52) U.S. Cl. .................. 367/182; 367/185

(58) Field of Classification Search .............. 367/182, 367/185
See application file for complete search history.

(56) References Cited

U.S. PATENT DOCUMENTS

| | | | |
|---|---|---|---|
| 2,902,667 A * | 9/1959 | Schriever | 367/184 |
| 3,184,848 A * | 5/1965 | Lawrence | 33/1 C |
| 3,296,589 A | 1/1967 | Ikrath | |
| 3,582,874 A | 6/1971 | Fedoseenko, et al. | |
| 3,609,310 A | 9/1971 | Newington et al. | |
| 3,718,900 A | 2/1973 | Holmes | |
| 3,738,445 A | 6/1973 | Wilson et al. | |
| 3,739,330 A | 6/1973 | Hazelhurst et al. | |
| 3,742,441 A | 6/1973 | Riley | |
| 3,913,063 A | 10/1975 | Sears | |
| 4,051,718 A | 10/1977 | Meckl et al. | |
| 4,096,624 A * | 6/1978 | Gray et al. | 29/596 |
| 4,110,731 A | 8/1978 | Elswood | |
| 4,144,520 A | 3/1979 | McNeel | |
| 4,152,692 A | 5/1979 | McNeel | |
| 4,159,464 A | 6/1979 | Hall | |
| 4,238,845 A | 12/1980 | Haggard et al. | |
| 4,266,287 A | 5/1981 | Elswood et al. | |
| 4,285,054 A | 8/1981 | McNeel | |
| 4,304,932 A | 12/1981 | Phillips et al. | |
| 4,323,994 A | 4/1982 | Coogler | |
| 4,376,304 A | 3/1983 | Uchida et al. | |
| 4,382,410 A * | 5/1983 | Bowling et al. | 102/310 |

(Continued)

FOREIGN PATENT DOCUMENTS

EP 0184231 6/1986

(Continued)

OTHER PUBLICATIONS

International Search Report of corresponding application No. PCT/US2010/041393 dated Sep. 1, 2010.

(Continued)

*Primary Examiner* — Thomas Tarcza
*Assistant Examiner* — James Hulka
(74) *Attorney, Agent, or Firm* — Gary L. Bush; Brett T. Cooke; Andrews Kurth LLP

(57) ABSTRACT

A geophone utilizing an Alnico-9 magnet and having an improved sensitivity over Alnico-9 geophones of prior art through the lengthening of the parasitic air gap between the upper and lower pole pieces which, results in less magnetic flux leakage. The flux concentration through the geophone coils is increased and shifted towards the ends of the magnet. The increase of sensitivity of geophone of the present invention over prior art geophones may exceed 3 dB. The axial length of the coil bobbin is increased, and the positions of the electrical coils are moved towards the ends of the magnet to align with the shifted magnetic flux.

26 Claims, 7 Drawing Sheets

U.S. PATENT DOCUMENTS

| | | | |
|---|---|---|---|
| 4,412,317 | A | 10/1983 | Asjes et al. |
| 4,504,932 | A | 3/1985 | Sundt |
| 4,538,203 | A | 8/1985 | Flanner et al. |
| 4,597,070 | A | 6/1986 | Redeker |
| 4,621,250 | A | 11/1986 | Echasseriau et al. |
| 4,623,991 | A | 11/1986 | Vitringa |
| 4,685,094 | A | 8/1987 | Vitringa et al. |
| 4,744,520 | A | 5/1988 | Widmer |
| 4,928,263 | A | 5/1990 | Armstrong et al. |
| 5,119,345 | A | 6/1992 | Woo et al. |
| 5,134,594 | A | 7/1992 | Woo |
| 5,199,005 | A | 3/1993 | Forsberg |
| 5,280,239 | A | 1/1994 | Klimovitsky et al. |
| 5,450,375 | A | 9/1995 | Woo |
| 5,469,408 | A | 11/1995 | Woo |
| 5,555,222 | A | 9/1996 | Woo |
| 5,694,375 | A | 12/1997 | Woodall |
| 5,774,415 | A | 6/1998 | Hall et al. |
| 5,924,670 | A | 7/1999 | Bailey et al. |
| 5,949,742 | A | 9/1999 | Delany et al. |
| 6,060,881 | A | 5/2000 | Dilger et al. |
| 6,075,754 | A | 6/2000 | VanZandt et al. |
| 6,575,033 | B1 | 6/2003 | Knudsen et al. |
| 6,595,285 | B2 | 7/2003 | DuBois et al. |
| 6,789,424 | B2 | 9/2004 | Knudsen et al. |
| 6,805,008 | B2 | 10/2004 | Selvakumar et al. |
| 6,882,595 | B2 | 4/2005 | Woo |
| 6,922,374 | B2 | 7/2005 | Hagedoorn et al. |
| 7,013,729 | B2 | 3/2006 | Knudsen et al. |
| 7,082,079 | B2 | 7/2006 | Woo |
| 7,099,235 | B2 | 8/2006 | Kamata |
| 7,116,850 | B2 | 10/2006 | Woo |
| 7,225,662 | B2 | 6/2007 | Kamata |
| 7,284,431 | B1 | 10/2007 | Barger |
| 7,369,716 | B2 | 5/2008 | Berg et al. |
| 7,443,154 | B1 | 10/2008 | Merewether et al. |
| 7,443,766 | B2 | 10/2008 | Grimes et al. |
| 7,639,566 | B2 * | 12/2009 | Kamata et al. ................ 367/183 |
| 2007/0223314 | A1 | 9/2007 | Hagedoorn |
| 2009/0028375 | A1 | 1/2009 | Richoux et al. |

FOREIGN PATENT DOCUMENTS

| | | |
|---|---|---|
| GB | 422695 | 1/1935 |
| GB | 791928 | 3/1958 |
| GB | 2022359 | 12/1979 |
| WO | 1996/02855 | 2/1996 |
| WO | 2002/18975 | 3/2002 |

OTHER PUBLICATIONS

International Search Report of application No. PCT/US2010/041395 dated Sep. 1, 2010.

International Search Report of application No. PCT/US2010/041400 dated Sep. 23, 2010.

* cited by examiner

GEOPHONE HAVING IMPROVED SENSITIVITY

BACKGROUND OF THE INVENTION

1. Field of the Invention

This invention relates generally to geophones used in seismic exploration.

2. Description of the Prior Art

FIG. 1 shows a vertical geophone 10 of conventional design. FIG. 1 is a cross section taken along the longitudinal axis 12 of the geophone 10. Geophone 10 employs a cylindrical magnet 14, cylindrical upper and lower ferrous pole pieces 16, 18, and a tubular ferrous outer housing 20, which together form a magnetic circuit.

Upper and lower pole pieces 16, 18 each have a cap-like shape so that they fit over and receive the upper and lower ends of magnet 14, respectively. The tubular portion of the upper and lower pole pieces that enclose the sides of cylindrical magnet 14 are referred to herein as the pole piece lips 80, 82. Magnet 14 and pole pieces 16, 18 are received within outer cylindrical housing 20. An upper annular air gap 22 exists between upper pole piece 16 and outer housing 20, and a lower annular air gap 24 exists between lower pole piece 18 and outer housing 20.

Lower pole piece 18 and the lower end of outer housing 20 are connected to a lower end cap 26, which is in turn connected to a stake (not shown) that is placed within the ground to couple ground vibrations to the magnet and pole pieces. Lower end cap 26 is typically formed of a dielectric plastic material. An upper end cap 28 is connected between upper pole piece 16 and the upper end of outer housing 20. Upper end cap 28 is also typically made of a dielectric plastic material.

Within the annular space formed between magnet 14 and upper and lower pole pieces 16, 18, on the one hand, and cylindrical outer housing 20 on the other, an inertial member—generally a cylindrical bobbin 30—is suspended between an upper frequency-tuned spring 32 and a lower frequency-tuned spring 34. Upper frequency spring 32 is carried by a thin dielectric wafer 52, which in turn is carried by the upper pole piece 16. Lower frequency spring 34 is carried by a contact spring 36, which in turn is carried by lower end cap 26. The frequency springs allow the magnet 14, pole pieces 16, 18, and outer housing 20 to vibrate up and down axially with respect to bobbin 30 while the bobbin remains essentially motionless and decoupled from the rest of the geophone. The frequency springs are designed and tuned to provide a desired resonant frequency.

An upper electrical coil 40 is wound about bobbin 30 in the vicinity of the upper air gap 22, and a lower electrical coil 42 is wound about bobbin 30 in the vicinity of lower air gap 24. The winding direction of upper coil 40 is opposite to the winding direction of lower coil 42. An electrical circuit is formed as follows: The upper lead 80 of upper coil 40 is connected to the outer circumference of upper frequency spring 32 by solder joint. The inner circumference of the upper frequency spring makes sliding electrical contact with a first lead 60 that passes through upper end cap 28. The inner circumference of the upper frequency spring is electrically isolated from upper pole piece 16 by thin dielectric wafer 52 that is positioned therebetween. The lower lead of upper coil 40 is connected to the upper lead of lower coil 42 by a connecting wire 62. The lower lead 82 of lower coil 42 is connected to the outer circumference of lower frequency spring 34 by solder joint. The inner circumference of lower frequency spring 34 makes sliding electrical contact with the lower surface of lower pole piece 18. Contact spring 36 forces the inner circumference of lower frequency spring 34 to abut lower pole piece 18 in opposition to the force of gravity. An electrical path is formed between lower pole piece 18 and upper pole piece 16 through abutting contact of the upper and lower pole pieces with magnet 14. Finally, upper pole piece 16 makes sliding electrical contact with a second lead 64 that passes through upper end cap 28. The first and second leads 60, 64 are connected to geophone recording circuitry through a seismic cable. The arrangement of this electrical circuit allows bobbin 30 to freely rotate within geophone 10, thus minimizing the possibility of damage from rough handling.

Geophone 10 defines a magnetic circuit as follows: A magnetic flux is created by and passes axially through magnet 14. This magnetic flux is channeled through the upper and lower pole pieces 16, 18, passes radially through upper and lower air gaps 22, 24, and then passes through outer cylindrical housing 20 to form a complete magnetic circuit. The complete magnetic circuit is illustrated via flux line 71 of FIG. 2.

In operation, a terrestrial vibration causes the magnetic circuit components, and hence the magnetic flux, to vibrate up and down relative to bobbin 30, which remains essentially inertially stationary. As the radial flux lines cut the upper and lower coils 40, 42, an electromotive force is induced in the coils according to Faraday's law. This induced voltage is measured at the first and second leads 60, 64 via the electrical circuit described above.

FIG. 2 is a cut away view in partial cross-section of a portion of prior art geophone 10, shown without bobbin 30 and coils 40, 42 for simplicity. Radial lines of magnetic flux 70 crossing air gaps 22, 24 between upper and lower pole pieces 16, 18 and outer cylinder housing 20 are illustrated. Although the radial air gap magnetic flux 70 is normal to the axis of magnet 14, the flux has a tendency to fringe across the air gaps 22, 24 at the upper and lower ends of the pole piece lips 80, 82, as depicted by the bulging flux lines 72. The effect of the fringing is to increase the cross-sectional area and thus the permeance of the high-reluctance air gap. This fringing effect creates non-linearities in the magnetic flux density within the air gap, which results harmonic distortion and a non-linear geophone response. Thus it has heretofore been a concern of the prior art to maximize the linearity of the magnetic flux density passing through upper and lower air gaps to minimize harmonic distortion induced in the geophone response. Geophone 10 of prior art is designed to maximize linearity by having a long length lp of the upper and lower pole pieces 16, 18, so that the cross-sectional area of the air gaps is increased and the fringing of the flux is lowered. In order to keep the size and weight of the geophone minimal, the pole piece lips 80, 82 are lengthened to concentrate the magnetic flux near the center of magnet 14.

Some of the magnetic flux will also leak across the air gap 25 formed between the upper and lower pole pieces 14, 16. Because this flux leakage does not pass through the upper and lower coils 22, 24, it does not contribute to signal generation, and is thus referred to as a parasitic flux leakage. This parasitic flux leakage is shown by flux lines 74 in FIG. 2. Although increasing the lip length $l_l$ of the upper and lower pole pieces increases geophone response linearity, it also has the effect of decreasing the length $l_g$ of the parasitic air gap 25. This smaller $l_g$ results in lower parasitic reluctance, greater parasitic flux leakage, and thus a concomitant reduction in geophone sensitivity.

In conducting a seismic survey, multiple geophone channels are recorded. Because geophone sensitivity is low, each geophone channel typically includes between six and twelve geophones in order to produce a required voltage signal for recording. As computing power increases, it has become more desirable to conduct high resolution surveys across large geographical areas, which necessitates that large number of geophone channels are employed in a given survey. Therefore, it is likewise desirable to increase geophone sensitivity so that a fewer number of geophones are required per channel to obtain a sufficient signal strength, thus reducing the overall capital and operational cost of the survey system.

Damping of bobbin 30 is necessary so that there will not be continual oscillation of bobbin relative to the rest of the geophone. Referring to prior art geophone 10 of FIG. 1, damping of bobbin 30 is a function of the mass and the electrical conductivity of bobbin 30 (the conductivity affects the formation of eddy currents formed in bobbin 30 by Faraday induction, which eddy currents flowing in a magnetic field result in a force being exerted on bobbin 30 that opposes the motion that created the eddy currents). There is limited ability to control the conductivity of bobbin 30, and machining tolerances prohibit fine control of the mass of bobbin 30. Once a graphic design is finalized, the mass of upper and lower coils 40, 42 is fixed. The result of these factors is an inability to tightly control the damping tolerance. It is therefore desirable to control the bobbin mass more tightly in order to more precisely control the geophone damping.

Referring to prior art vertical geophone 10 of FIG. 1, the lower lead of lower coil 42 is electrically connected to lower pole piece 16 by lower frequency spring 34. Typically, the coil lead is soldered to the outer circumference of lower frequency spring 34. The inner circumference of the lower frequency spring makes a sliding electrical contact with the lower surface of lower pole piece 16, so that lower frequency spring 34 is free to rotate with respect to the lower pole piece 16.

In order to keep lower frequency spring 34 seated against lower pole piece 16 for electrical continuity, a contact spring 36 is placed between lower end cap 26 and lower frequency spring 34, which puts an upward compressive force on the inner circumference of lower frequency spring 34. However, because lower frequency spring 34 is supported by a resilient contact spring 36, rather than a rigid, stable platform, distortion of the natural sinusoidal response to an impulse is created. Moreover, tuning the geophone frequency response by control of the lower frequency spring 34 is made more difficult because of the serial spring-spring arrangement.

Other geophone designs of prior art, such as that disclosed in U.S. Pat. No. 5,119,345 issued to Woo et al., seat the lower frequency spring directly on the lower end cap. However, these design do not employ the lower frequency spring as an electrical circuit element. For example, in the Woo '345 patent, two upper pigtail springs 40 and 42 are used to provide electrical connections between the geophone coils and the geophone case. Thus, the bobbin and coil assembly have a limited ability to rotate within the geophone housing, which can result in damage to the geophone if it is subjected to rough handling during deployment or retrieval, for example.

It is therefore desirable to have a vertical geophone arrangement in which the bobbin and coil assembly is free to rotate within the geophone case and in which the lower frequency spring that forms part of the electrical circuit is not supported by a resilient contact spring.

IDENTIFICATION OF OBJECTS OF THE INVENTION

A primary object of the invention is to provide a geophone having a 3 dB increase in sensitivity over geophones of prior art.

Another object of the invention is to provide method and apparatus for increasing geophone magnetic flux density by moving or changing pole piece geometry.

Another object of the invention is to provide a method and apparatus for precisely controlling geophone damping by tightly controlling the overall mass of a geophone coil/bobbin assembly.

Another object of the invention is to provide a vertical geophone characterized by lower distortion of the natural sinusoidal response to an impulse source.

Another object of the invention is to provide a vertical geophone having a frequency spring that is disposed directly on the lower end cap, which also forms part of the electrical circuit.

SUMMARY OF THE INVENTION

The objects described above and other advantages and features of the invention are incorporated in a geophone that is characterized by a parasitic flux leakage that is significantly reduced lengthening the spacing between the magnetic pole pieces. The result of moving the pole pieces further away from the magnetic center is a shift in the magnetic flux towards and beyond the ends of the magnet. The axial length of the foil bobbin and the outer cylindrical housing are likewise increased, and the positions of the upper and lower coils are moved towards the ends of the magnet as appropriate to align with the shifted radial magnetic flux.

In a preferred embodiment, the geophone employs an Alnico-9 magnet. The thickness of the pole pieces is increased while the effective length of the pole pieces is decreased, as compared to Alnico-9 geophones of prior art. The wall thickness of the cylindrical housing is also increased minimize flux leakage outside of the housing due to the increased flux density.

The coil bobbin ideally includes a provision for receiving a third coil winding between the upper and lower coils. This third coil is a mass tuning coil whose purpose is to adjust the overall mass of the bobbin assembly with greater accuracy and precision than can be achieved by machining alone. Mass is adjusted by adding or subtracting one or more turns of wire in the tuning coil. The tuning coil is preferably electrically shorted for increasing geophone damping.

The geophone according to an embodiment of the invention is a vertical geophone that includes a lower frequency spring which is positioned directly on the lower end cap. This arrangement eliminates the "spring supported by a spring" arrangement of prior art geophones to minimize geophone distortion and simplify tuning of the frequency springs. A contact spring is positioned between the lower frequency spring and the lower pole piece for forming part of the geophone electrical circuit. One surface of the contact spring includes a plurality of wiper surfaces that ensure consistent sliding electrical contact against either the bottom surface of the lower pole piece or the upper surface of the lower frequency spring. The obverse surface of the contact spring is preferably spot welded to the upper surface of the lower frequency spring or the bottom surface of the lower pole piece, respectively.

BRIEF DESCRIPTION OF THE DRAWINGS

The invention is described in detail hereinafter on the basis of the embodiments represented in the accompanying figures, in which.

DESCRIPTION OF THE PREFERRED EMBODIMENT OF THE INVENTION

Figure 1:
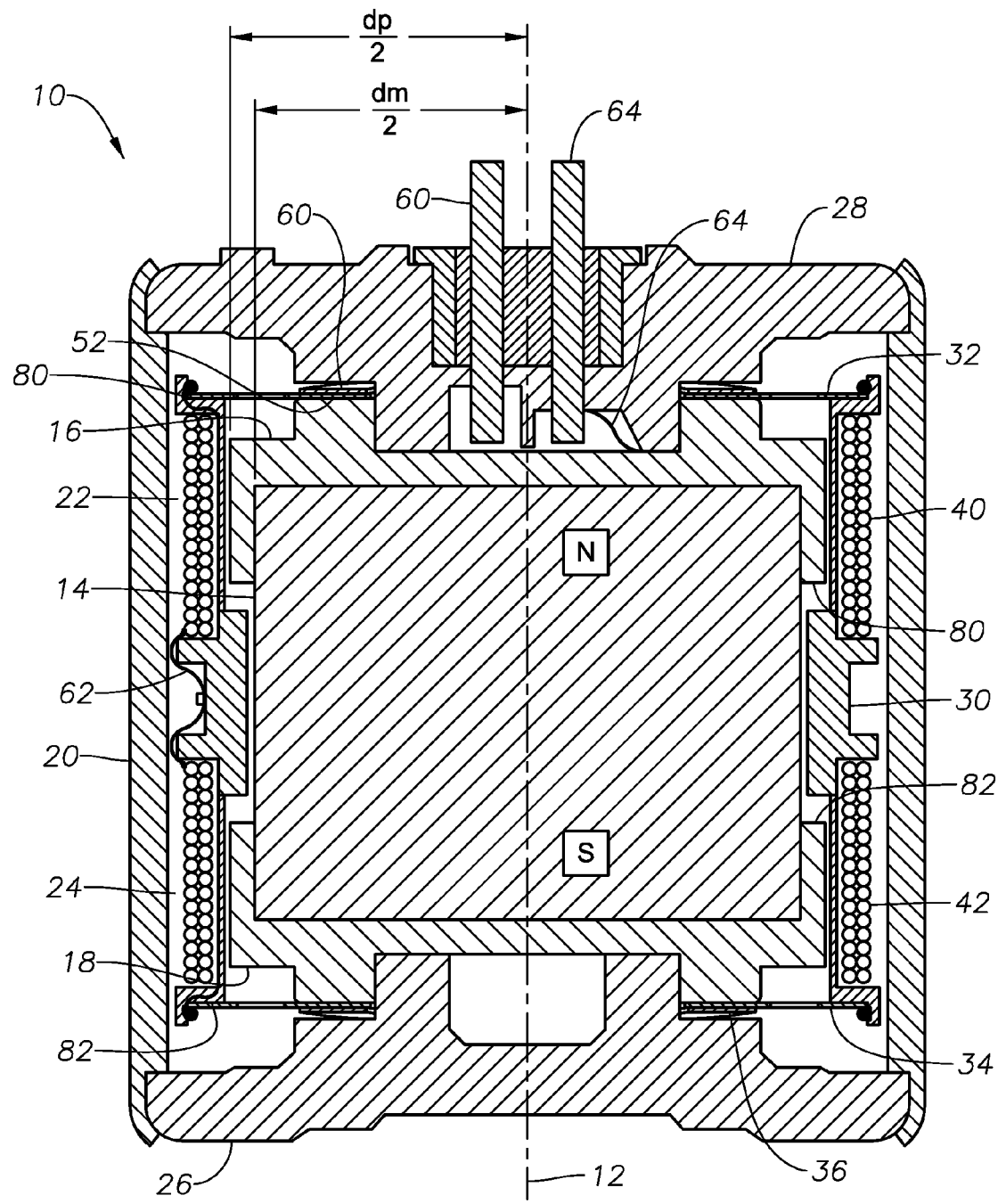
FIG. 1 is a cross-section side view of a typical vertical geophone assembly of prior art taken along the geophone longitudinal axis, showing a magnet, upper, lower pole pieces, an outer cylindrical housing, and a bobbin carrying electrical coils that is suspended within the cylindrical housing between upper and lower springs.
Figure 2:
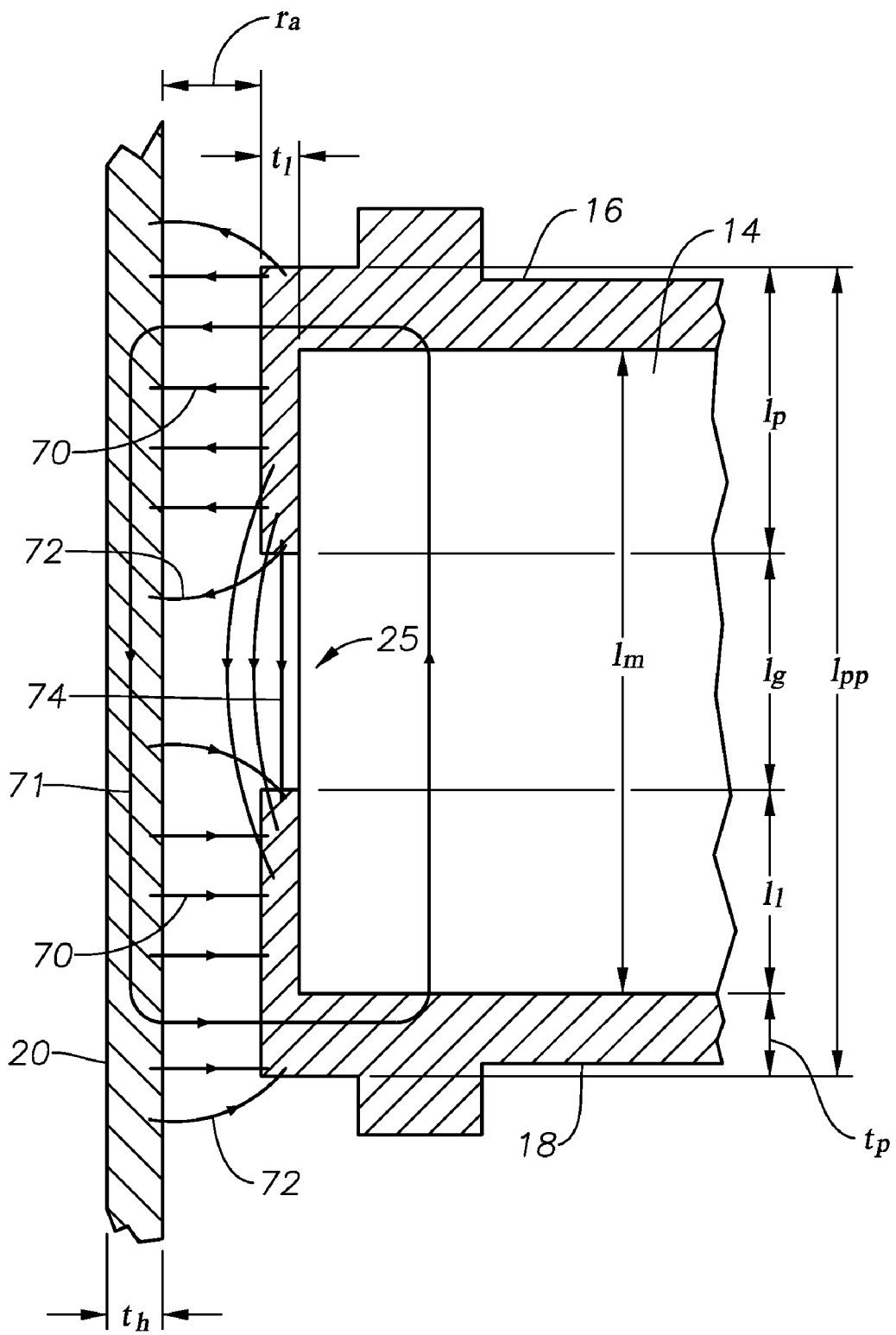
FIG. 2 is an enlarged side view in partial cross-section of a portion of the prior art geophone of FIG. 1, shown without the bobbin and coils for simplicity.
Figure 3:
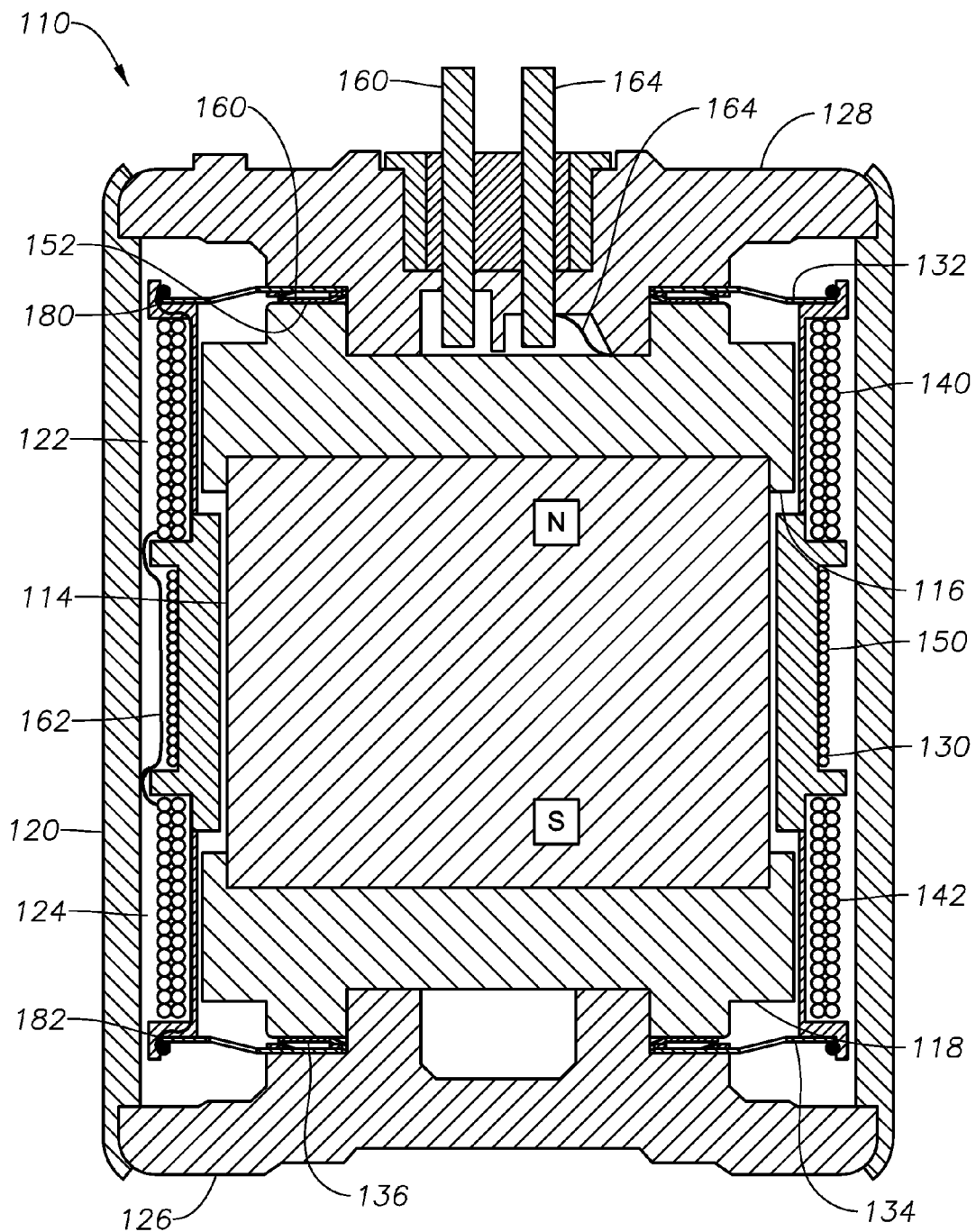
FIG. 3 is a cross-section side view of a vertical geophone assembly according to a first embodiment of the invention, showing upper and lower pole pieces that have been extended axially away from the magnet compared to the prior art geophone of FIG. 1.
Figure 4:
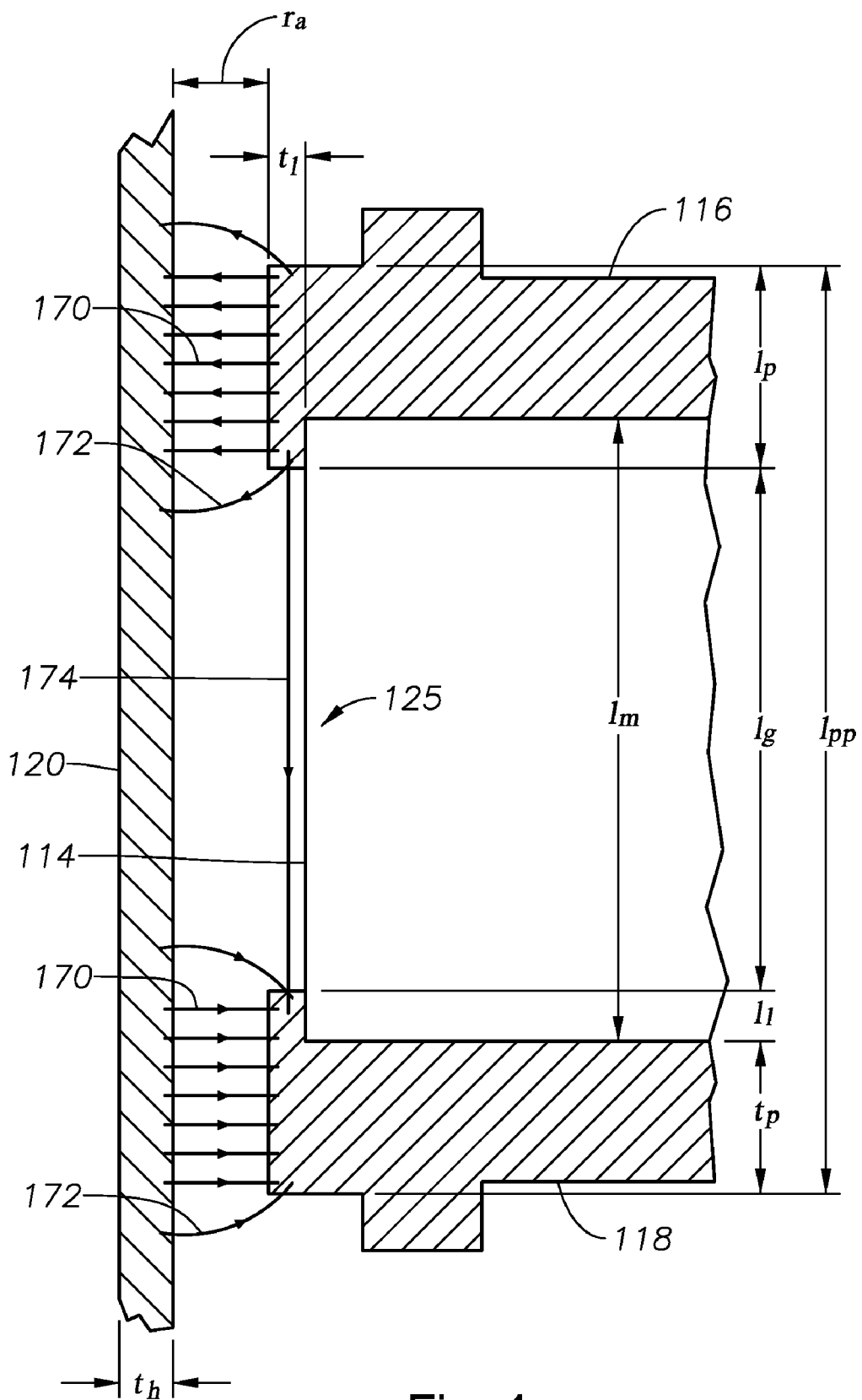
FIG. 4 is an enlarged side view in partial cross-section of a portion of the geophone of FIG. 3 shown without the bobbin and coils for simplicity.
Figure 5:
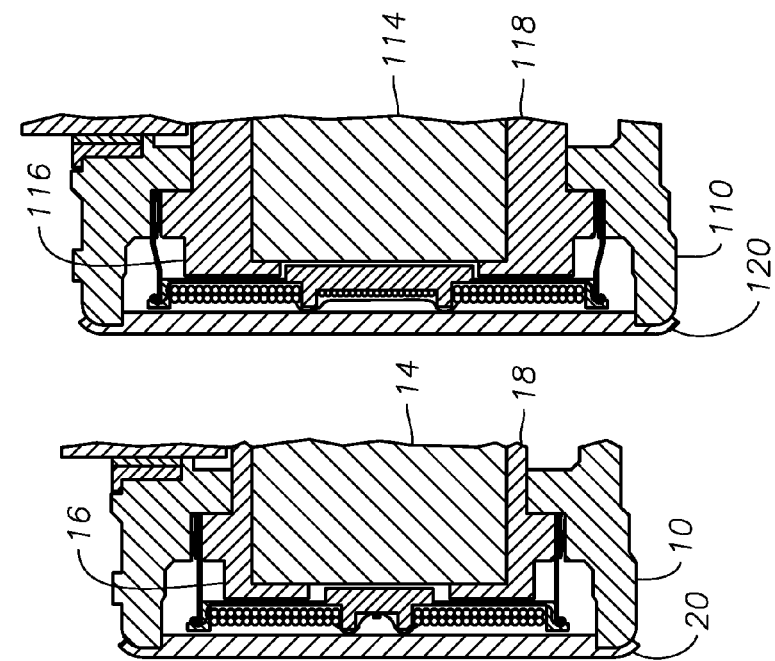
FIG. 5 is a side-by-side comparison of prior art geophone of FIG. 1 and the geophone of FIG. 3 according to a first embodiment of the invention and a graph of radial magnetic flux in the air gap passing between the pole pieces and outer cylindrical housing versus geophone axial position for each geophone.
Figure 5:
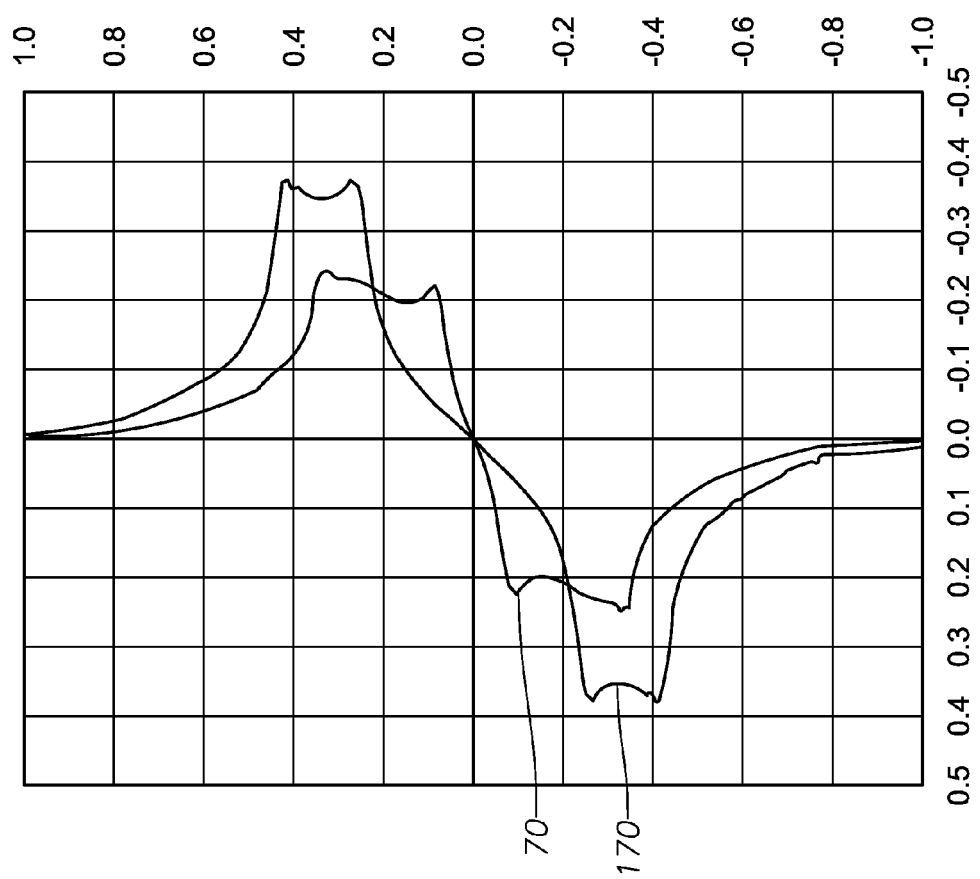

FIG. 3 illustrates an improved geophone 110 according to an embodiment of the invention, which for a given magnet type and geometry may have a greater sensitivity than geophone 10 (FIG. 1) of prior art. FIG. 3 is drawn to the same scale as FIG. 1. FIG. 4 is a cut away view in partial cross-section of geophone 110 of FIG. 3, shown without bobbin 130 and coils 122, 124 for simplicity. FIG. 5 is a side-by-side comparison of geophone 110 with prior art geophone 10. On the left side FIG. 5, a cross section of the typical geophone 10 of FIG. 1 is shown. On the right side, a geophone 110 of FIG. 3 and according to an embodiment of the invention is shown. The two geophone drawings 10, 110 are illustrated in the same scale and positioned along a common centerline so that a comparison may be readily made.

Referring to FIGS. 3-5, as compared to prior art geophone 10 of FIG. 1, geophone 110 is characterized by a parasitic flux leakage that is significantly reduced, because the $l_g$ dimension is increased. Magnet 114 is the exact same size as magnet 14, yet geophone 110 has a longer axial length than geophone 10. The upper and lower pole pieces 116, 118 have been extended further beyond the ends of magnet 114. The result of moving the pole pieces further away from the magnetic center is a shift in the magnetic flux towards and beyond the ends of magnet 114. The axial length of bobbin 130 and outer cylindrical housing 120 are likewise increased, and the positions of upper and lower coils 140, 142 are moved towards the ends of magnet 114 appropriately to align with the radial magnetic flux. Because the length $l_g$ of the parasitic air gap 125 between the upper and lower pole pieces 116, 118 is extended, a larger parasitic air gap reluctance $R_p$ is created, and less flux leakage occurs.

The $l_p$ dimension of geophone 110 may be less than, equal to or greater than $l_p$ of geophone 10. For a given $l_g$ a greater $l_p$ results in greater sensitivity and greater linearity, but at the expense of a greater $l_{pp}$ and greater weight, size and deployment costs.

Parasitic flux leakage is shown by flux lines 174 (FIG. 4). This parasitic flux leakage may be modeled as a parasitic reluctance $R_p$ in parallel with the magnetic circuit formed by series combination of reluctances of the upper and lower air gaps and the cylindrical outer housing, combined with the counter magnetic motive force induced in coils 122, 124 as the coils cut the lines of flux. In practice, modeling is more difficult as the overall magnetic field properties are highly dependent on the material and geometry of magnet 114, including the $l_m/d_m$ ratio.

The reluctance $R_a$ of one of the upper or lower annular air gaps is approximated by $$R_a \approx \frac{r_a}{\pi d_p l_p \mu_o} \quad (1)$$

where $r_a$ is the radial distance between the upper or lower pole piece and the outer cylindrical housing 120, $d_p$ is the outer diameter of the upper and lower pole pieces, $l_p$ is the length of the upper or lower pole piece, and $\mu_o$ is the permeability of free space. The parasitic reluctance $R_p$ is approximated by $$R_p \approx \frac{l_g}{\pi d_p t_l \mu_o} \quad (2)$$

where $l_g$ is the longitudinal distance between the lips of the upper and lower pole pieces, $d_p$ is the diameter of the pole piece, $t_l$ is the thickness of the pole piece lip, and $\mu_o$ is the permeability of free space.

Flux leakage is minimized by decreasing the annular air gap reluctance $R_a$ and increasing the parasitic reluctance $R_p$. Thus, the greater the ratio of $R_p/R_a$, the greater the geophone sensitivity will be. From the simplified relations of equations (1) and (2), it can be shown that $$R_p/R_a \approx \frac{l_p l_g}{r_a t_l}. \quad (3)$$

According to a preferred embodiment of the invention, magnet 114 is an Alnico-9 cylinder with a length-to-diameter ratio ($l_m/d_m$) between 0.5 and 1.0, and the geophone ratio $$\frac{l_p l_g}{r_a t_l}$$

is greater than 14. More preferably still, $l_m/d_m$ ranges between 0.7 and 0.9, and $$\frac{l_p l_g}{r_a t_l}$$

is greater than 20.

Geophone performance can also be considered using other geometric ratios. For example, the smaller the $l_g$ dimension relative to the $r_a$ dimension, the greater the geophone sensitivity will be. Prior art geophones 10 typically have a $l_g/r_a$ ratio under 2.5, whereas geophone 110 has a $l_g/r_a$ ratio greater than 4, and more preferably still, greater than 6.0. Likewise, for a given pole-to-pole distance $l_{pp}$, the greater the $l_g$ dimension (at least until $l_p$ approaches $t_l$), the greater the geophone sensitivity will be. Prior art geophones 10 typically have a $l_g/l_{pp}$ ratio less than 0.25, whereas geophone 110 has a $l_g/l_{pp}$ ratio greater than 0.4, and more preferably still, greater than 0.5.

The dimensions of upper and lower pole pieces 116, 118 is also important to the functioning of geophone 110. The ratio of the pole length $l_p$ to the lip length $l_l$ is related to the thickness $t_p$ of the pole piece. It the pole pieces are too thin, too much flux will leak beyond the top and bottom ends of the upper and lower pole pieces 116, 118, respectively. Conversely, if the pole pieces are too thick, the geophone 110 becomes too heavy to be commercially attractive. Preferably, $l_p/l_l$ ranges between 0.2 and 6.0, and more preferably still, between 0.4 and 1.0.

Figure 6:
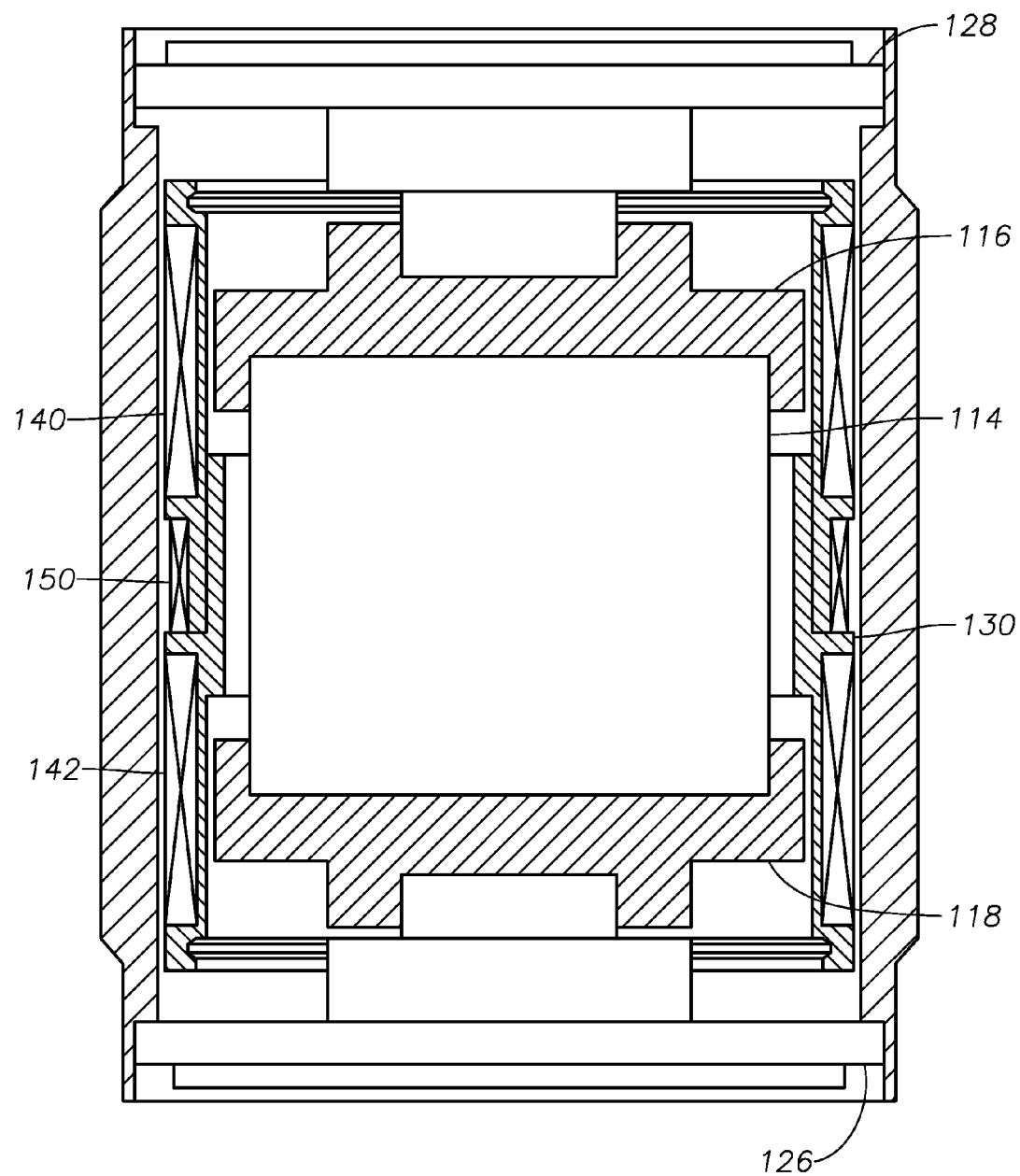
FIG. 6 is a detailed cross-section side view of a vertical geophone assembly of FIG. 3 illustrating preferred geometrical ratios and shapes.

Similarly, in a typical geophone 10 of prior art, the outer cylindrical housing 20 is made quite thin to minimize weight. The wall thickness of $t_h$ of housing 20 is typically about one-half the radial air gap distance $r_a$. However, in geophone 110 according to a preferred embodiment, the wall thickness of cylindrical housing 120 is greater to minimize flux leakage outside of the housing. Ideally, the $t_h/r_a$ ratio exceeds 0.7, and more ideally still, 1.0. As shown in FIG. 6, this increased wall thickness occurs only in the region in which the active magnetic circuit region—the region which is axially located between the top of upper pole piece 116 and the bottom of lower pole piece 118. The top and bottom regions of housing 120 that extend beyond the pole-to-pole longitudinal region are have a reduced wall thickness to minimize weight.

Geophone 110 is also preferably characterized by a $t_p/l_m$ ratio greater than 0.15, a $l_g/r_a$ ratio greater than 5.5, a $t_h/r_a$ ratio greater than 0.7, a $l_p/l_l$ ratio greater than 1.7 and less than 5.0, a $d_p/d_m$ ratio greater than 1.11 and less than 1.14, a $l_l/l_m$ ratio greater than 1.11 and less than 1.14, and a $r_a/d_m$ ratio greater than 0.097 and less than 0.12.

The graph of FIG. 5 illustrates the annular flux distribution of geophone 110 according to the preferred embodiment compared to a typical geophone 10 of prior art. Geophone 110 results in a substantial increase in flux density 174 over flux density 70 from geophone 10. The positions at which the flux density is greatest is also extend toward the longitudinal ends of magnet 114. This increased flux density 174 results in a sensitivity improvement of a 3 dB or more of geophone 110 over the prior art geophones 10.

Referring to FIGS. 3 and 6, bobbin 130 includes a provision for receiving a third coil winding 150 between upper coil 140 and lower coil 142. Coil 150 is a mass tuning coil whose purpose is to adjust the overall mass of bobbin 130 with greater accuracy and precision than can be achieved by machining alone. Mass is adjusted by adding or subtracting one or more turns of wire in coil 150. Coil 150 may be an open-circuited or short-circuited coil, but a shorted coil 150 results in induced currents, counter magnetic motive force and increased geophone damping compared to an open-circuited coil. U.S. Pat. No. 4,159,464 issued to Hall, Jr. on Jun. 26, 1979 discloses a similar arrangement of s geophone with a mass tuning coil, and it is incorporated herein by reference. However, Hall Jr. teaches away from the preferred embodiment of short circuiting the mass tuning coil 150.

Referring back to FIG. 3, according to a preferred embodiment of the invention, lower frequency spring 134 is positioned directly on lower end cap 126, thus alleviating the difficulties arising from the "spring supported by a spring" arrangement of prior art geophone 10. This arrangement minimizes distortion of the natural geophone sinusoidal response to an impulse vibration. The lower lead 182 of lower coil 142 is soldered to the outer circumference of lower frequency spring 134, as before. Electrical contact between the inner circumference of lower frequency spring 134 and the lower surface of lower pole piece 118 is bridged by a contact spring 136 that is positioned therebetween.

The upper surface of contact spring 136 includes a plurality of wiper surfaces that ensure consistent electrical contact against the bottom of lower pole piece 118. The lower surface of contact spring 136 is preferably spot welded to the upper surface of lower frequency spring 134 to eliminate an additional sliding electrical contact there. Alternatively, the lower surface of contact spring 136 includes a plurality of wiper surfaces that abut the upper surface of lower frequency spring 134, and the upper surface of contact spring 136 is spot welded to the bottom of lower pole piece 118. In this manner, contact spring 136 is free to rotate with respect to lower frequency spring 134.

Figure 7:
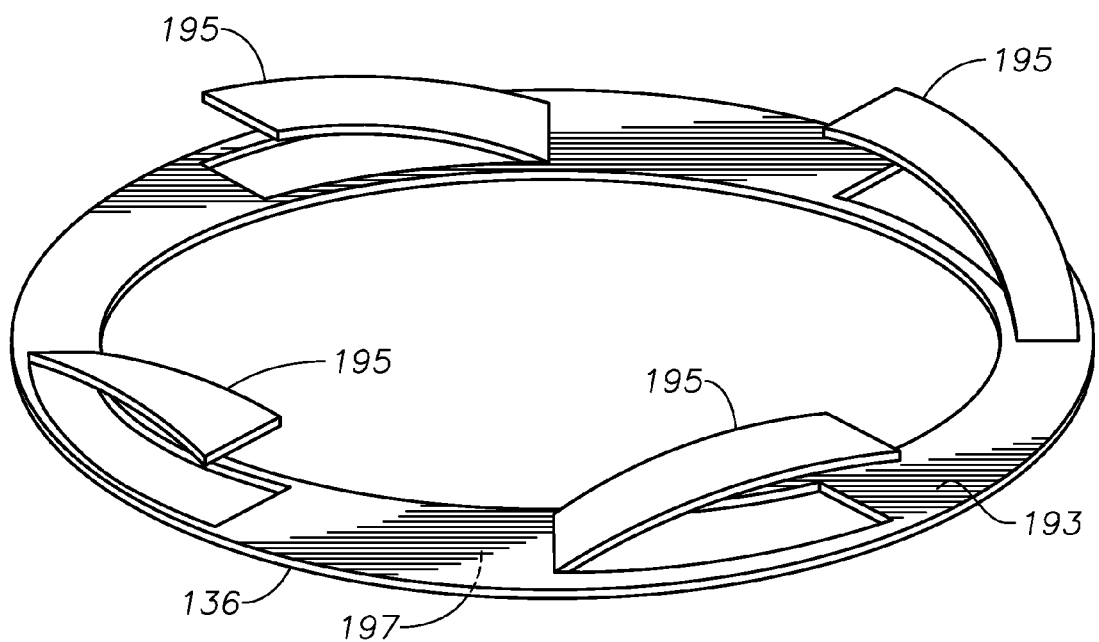
FIG. 7 is an enlarge perspective view of a contact spring for the vertical geophone of FIG. 3 according to a preferred embodiment of the invention, showing wiper contact surfaces formed therein for maintaining consistent sliding electrical contact between the contact washer and an adjacent member.

FIG. 7 illustrates a preferred embodiment of contract spring 136 according to the invention. Contact spring 136 is preferably a washer-like structure that has a first surface 193 that includes a plurality of wipers 195, i.e., movable electrical contact surfaces or edges, for ensuring consistent electrical contact between contact spring 136 and either the lower surface of lower pole piece 118 or the upper surface of lower frequency spring 134 (FIG. 3). Wipers 195 may be formed by bending the washer-like body of contact spring 136 or by punching portions of contact ring 136 by use of a die, for example. The wipers are formed to be resilient springs so that they are under compression when in stalled in geophone 110, thus maintaining contact with the adjacent member. The obverse surface 197 of contact spring 136 is preferably spot welded to lower frequency spring 134 or lower pole piece 118, respectively (FIG. 3), so that only one sliding electrical interface need exist between lower frequency spring 134 and lower pole piece 118.

The Abstract of the disclosure is written solely for providing the United States Patent and Trademark Office and the public at large with a way by which to determine quickly from a cursory reading the nature and gist of the technical disclosure, and it represents solely a preferred embodiment and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein:

What is claimed is:

1. A geophone (110) comprising:
a cylindrical magnet (114) having a length-to-diameter ratio ($l_m/d_m$) greater than 0.5 and less than 1.0;
upper and lower pole piece caps (116, 118) receiving the upper and lower ends of said magnet, respectively, said upper and lower pole piece caps (116, 118) together defining an overall longitudinal pole-to-pole length ($l_{pp}$) and a parasitic air gap (125) therebetween having a longitudinal air gap length ($l_g$), said upper and lower pole piece caps (116, 118) having a parasitic gap length to pole-to-pole length ratio ($l_g/l_{pp}$) greater than 0.25;
a tubular outer cylinder housing (120), said magnet (114) and upper and lower pole piece caps (116, 118) being coaxially received within and connected to said housing (120); and an electrical coil (140, 142) disposed between said magnet (114) and said housing (120) and movable in an axial direction with respect to said housing (120).

2. The geophone (110) of claim 1 wherein:
said magnet (114) is made of Alnico-9 material.

3. The geophone (110) of claim 1 wherein:
said length to diameter ratio ($l_m/d_m$) of said magnet (114) is greater than 0.7 and less than 0.9.

4. The geophone (110) of claim 1 wherein:
said parasitic gap length to pole-to-pole length ratio ($l_g/l_{pp}$) of said upper and lower pole piece caps (116, 118) is greater than 0.4.

5. The geophone (110) of claim 1 wherein:
said upper and lower pole piece caps (116, 118) each define a longitudinal pole length ($l_p$) and a lip length ($l_l$);
said upper and lower pole piece (116, 118) caps have a pole length to lip length ratio ($l_p/l_l$) greater than 0.2 and less than 6.0.

6. The geophone (110) of claim 5 herein:
said upper and lower pole piece caps (116, 118) each have a pole length to lip length ratio ($l_p/l_l$) greater than 0.4 and less than 1.0.

7. A geophone (110) comprising:
a cylindrical magnet (114) having a length-to-diameter ratio ($l_m/d_m$) greater than 0.5 and less than 1.0;
upper and lower pole piece (116, 118) caps receiving the upper and lower ends of said magnet (114), respectively, said upper and lower pole piece caps (116, 118) together defining a parasitic air gap (125) therebetween having a longitudinal parasitic gap (125) length ($l_g$);
a tubular outer cylindrical housing (120), said magnet (114) and upper and lower pole piece caps (116, 118) being coaxially received within and connected to said housing (120), said housing (120) and said upper and lower pole piece caps (116, 118) together defining upper and lower annular air gaps (122, 124), respectively, each of said upper and lower annulus air gaps (122, 124) having a radial air gap dimension ($r_a$), a parasitic gap length to radial air gap ratio ($l_g/r_a$) being greater than 4.0; and
an electrical coil (140, 142) assembly disposed in said upper and lower annular air gaps (122, 124) and movable in an axial direction with respect to said housing (120).

8. The geophone (110) of claim 7 wherein:
said magnet (114) is made of Alnico-9 material.

9. The geophone (110) of claim 7 wherein:
said length to diameter ratio ($l_m/d_m$) of said magnet (114) is greater than 0.7 and less than 0.9.

10. The geophone (110) of claim 7 wherein:
said parasitic gap to radial air gap ratio ($l_g/r_a$) is greater than 6.0.

11. The geophone (110) of claim 7 wherein:
said housing (120) has a pole-to-pole region that longitudinally aligns with said magnet (114) and said upper and lower pole caps (116, 118); and
said pole-to-pole region of said housing (120) has a wall-thickness to radial air gap ratio ($t_h/r_a$) that is greater than 0.7.

12. The geophone (110) of claim 11 wherein:
said pole-to-pole-region of said housing (120) has a wall-thickness to radial air gap ratio ($t_h/r_a$) that is greater than 1.0.

13. A geophone (110) comprising:
an Alnico-9 cylindrical magnet (114);
upper and lower pole piece caps (116, 118) receiving the upper and lower ends of said magnet (114), respectively, said upper and lower pole piece caps (116, 118) together defining a parasitic air gap (125) therebetween having a longitudinal parasitic gap length ($l_g$), said upper and lower pole piece caps (116, 118) each defining a longitudinal pole length ($l_p$) and a lip thickness ($t_l$);
a tubular outer cylindrical housing (120), said magnet (114) and said upper and lower pole piece caps (116, 118) being coaxially received within and connected to said housing (120), said housing (120) and said upper and lower pole piece caps (116, 118) together defining upper and lower annular air gaps (122, 124), respectively, each of said upper and lower annular air gaps (122, 124) having a radial air gap dimension ($r_a$); and
an electrical coil assembly (140, 142) disposed in said upper and lower annular air gaps (122, 124) and movable in an axial direction with respect to said housing (120);
wherein said geophone (110) is arranged so that the relation $$\frac{l_p l_g}{r_a l_l}$$

is greater than 14.

14. The geophone (110) of claim 13 wherein:
said geophone (110) is arranged so that the relation of $$\frac{l_p l_g}{r_a l_l}$$

is greater than 20.

15. The geophone (110) of claim 13 wherein:
said magnet (114) has a length to diameter atm ($l_m/d_m$) greater than 0.5 and less than 1.0.

16. The geophone (110) of claim 13 wherein:
said upper and lower pole piece caps (116, 118) together define an overall longitudinal pole-to-pole length ($l_{pp}$); and
a parasitic gap length to pole-to-pole length ratio ($l_g/l_{pp}$) of said geophone (110) is greater than 0.25.

17. The geophone (110) of claim 13 wherein:
said upper and lower pole piece caps (116, 118) each define a longitudinal lip length ($l_l$); and
a pole length to lip length ratio ($l_p/l_l$) of said geophone (110) is greater than 0.2 and less than 6.0.

18. The geophone (110) of claim 13 wherein:
a parasitic gap length to radial air gap ratio ($l_g/r_a$) of said geophone (110) is greater than 4.0.

19. The geophone (110) of claim 13 wherein:
said magnet (114) has a length to diameter ratio ($l_m/d_m$) greater than 0.7 and less than 0.9;
said upper and lower pole piece caps (116, 118) together define an overall longitudinal pole-to-pole length ($l_{pp}$);
a parasitic gap length to pole-to-pole length ratio ($l_g/l_{pp}$) of said geophone (110) is greater than 0.4;
said upper and lower pole piece caps (116, 118) each define a longitudinal lip length ($l_l$);
a pole length to lip length ratio ($l_p/l_l$) of said geophone (110) is greater than 0.4 and less than 1.0; and
a parasitic gap length-to-radial air gap ratio ($l_g/r_a$) of said geophone (110) is greater than 4.0.

20. The geophone (110) of claim 19 wherein:
the relation of $$\frac{l_p l_g}{r_a l_l}$$

is greater than 20.

21. A geophone magnetic field subassembly comprising:
a cylindrical magnet (114) having a length-to-diameter ratio ($l_m/d_m$) greater than 0.5 and less than 1.0; and
upper and lower pole piece caps (116, 118) receiving the upper and lower ends of said magnet, respectively, said upper and lower pole piece caps (116, 118) together defining an overall longitudinal pole-to-pole length ($l_{pp}$) and a parasitic air gap (125) therebetween having a longitudinal air gap length ($l_g$), said upper and lower pole piece caps (116, 118) having a parasitic gap length to pole-to-pole length ratio ($l_g/l_{pp}$) greater than 0.25.

22. A geophone (110) comprising:
an Alnico-9 cylindrical magnet (114) defining an axial magnet length ($l_m$);
upper and lower pole piece (116, 118) caps receiving the upper and lower ends of said magnet (114), respectively, said upper and lower pole piece caps (116, 118) defining a pole thickness ($t_p$) such that a ratio of said pole thickness to magnet length ($t_p/l_m$) is greater than 0.15;
a tubular outer cylindrical housing (120), said magnet (114) and upper and lower pole piece caps (116, 118) being coaxially received within and connected to said housing (120), said housing (120) and said upper and lower pole piece caps (116, 118) together defining upper and lower annular air gaps (122, 124), respectively; and
an electrical coil (140, 142) assembly disposed in said upper and lower annular air gaps (122, 124) and movable in an axial direction with respect to said housing (120).

23. A geophone (110) comprising:
a cylindrical magnet (114);
upper and lower pole piece caps (116, 118) receiving the upper and lower ends of said magnet, respectively, said upper and lower pole piece caps (116, 118) together defining a parasitic air gap (125) therebetween having a longitudinal air gap length ($l_g$);
a tubular outer cylindrical housing (120), said magnet (114) and upper and lower pole piece caps (116, 118) being coaxially received within and connected to said housing (120), said housing (120) and said upper and lower pole piece caps (116, 118) together defining upper and lower annular air gaps (122, 124), respectively, each of said upper and lower annulus air gaps (122, 124) having a radial air gap dimension ($r_a$) such that a ratio of said air gap length to said radial air gap dimension ($l_g/r_a$) is greater than 5.7; and
an electrical coil (140, 142) assembly disposed in said upper and lower annular air gaps (122, 124) and movable in an axial direction with respect to said housing (120).

24. A geophone (110) comprising:
a cylindrical magnet (114);
upper and lower pole piece caps (116, 118) receiving the upper and lower ends of said magnet, respectively;
a tubular outer cylindrical housing (120), said magnet (114) and upper and lower pole piece caps (116, 118) being coaxially received within and connected to said housing (120), said housing (120) and said upper and lower pole piece caps (116, 118) together defining upper and lower annular air gaps (122, 124), respectively, each of said upper and lower annulus air gaps (122, 124) having a radial air gap dimension ($r_a$), the region of said housing between said upper and lower annulus air gaps (122, 124) defining a housing wall thickness dimension ($t_h$) such that a ratio of said housing wall thickness dimension to said radial air gap dimension ($t_h/r_a$) is greater than 0.7; and
an electrical coil (140, 142) assembly disposed in said upper and lower annular air gaps (122, 124) and movable in an axial direction with respect to said housing (120).

25. A geophone (110) comprising:
a cylindrical magnet (114);
upper and lower pole piece caps (116, 118) receiving the upper and lower ends of said magnet, respectively, said upper and lower pole piece caps (116, 118) defining a pole length ($l_p$) and a lip length ($l_l$) such that a ratio of said pole length to said lip length ($l_p/l_l$) is greater than 2.1 and less than 5.0;
a tubular outer cylindrical housing (20), said magnet (114) and upper and lower pole piece caps (116, 118) being coaxially received within and connected to said housing (120), said housing (120) and said upper and lower pole piece caps (116, 118) together defining upper and lower annular air gaps (122, 124), respectively; and
an electrical coil (140, 142) assembly disposed in said upper and lower annular air gaps (122, 124) and movable in an axial direction with respect to said housing (120).

26. A geophone (110) comprising:
a cylindrical magnet (114) having a length-to-diameter ratio ($l_m/d_m$) greater than 0.5 and less than 1.0;
upper and lower pole piece caps (116, 118) receiving the upper and lower ends of said magnet, respectively, said upper and lower pole piece caps (116, 118) defining a pole length ($l_p$) and a lip length ($l_l$) such that a ratio of said pole length to said lip length ($l_p/l_l$) is greater than 1.7;
a tubular outer cylindrical housing (120), said magnet (114) and upper and lower pole piece caps (116, 118) being coaxially received within and connected to said housing (120), said housing (120) and said upper and lower pole piece caps (116, 118) together defining upper and lower annular air gaps (122, 124), respectively; and
an electrical coil (140, 142) assembly disposed in said upper and lower annular air gaps (122, 124) and movable in an axial direction with respect to said housing (120).

* * * * *